(12) United States Patent
Okamura et al.

(10) Patent No.: US 11,236,790 B2
(45) Date of Patent: Feb. 1, 2022

(54) VENTILATED TYPE BRAKE DISC ROTOR

(71) Applicant: KIRIU CORPORATION, Ashikaga (JP)

(72) Inventors: Toshikazu Okamura, Yokohama (JP); Tatsuya Yamagishi, Oyama (JP); Tatsuya Saito, Ashikaga (JP)

(73) Assignee: KIRIU CORPORATION, Ashikaga (JP)

( * ) Notice: Subject to any disclaimer, the term of this patent is extended or adjusted under 35 U.S.C. 154(b) by 31 days.

(21) Appl. No.: 16/708,758

(22) Filed: Dec. 10, 2019

(65) Prior Publication Data
US 2021/0062881 A1 Mar. 4, 2021

(30) Foreign Application Priority Data

Sep. 3, 2019 (JP) .............................. JP2019-160082

(51) Int. Cl.
*F16D 65/12* (2006.01)
*F16D 65/02* (2006.01)

(52) U.S. Cl.
CPC .... *F16D 65/128* (2013.01); *F16D 2065/1328* (2013.01); *F16D 2200/0013* (2013.01)

(58) Field of Classification Search
CPC .............................................. F16D 65/12–128
USPC ...................... 188/218 XL, 264 A, 264 AA
See application file for complete search history.

(56) References Cited

U.S. PATENT DOCUMENTS

| | | | | |
|---|---|---|---|---|
| 5,526,905 A * | 6/1996 | Shimazu | ................... | B60T 5/00 |
| | | | | 188/218 XL |
| 5,542,503 A | 8/1996 | Dunn et al. | | |
| 9,080,625 B2 * | 7/2015 | Oberti | ................... | F16D 65/128 |
| 2006/0243546 A1 * | 11/2006 | Oberti | ................... | F16D 65/123 |
| | | | | 188/218 XL |
| 2009/0057077 A1 * | 3/2009 | Mears | ................... | F16D 65/128 |
| | | | | 188/218 XL |
| 2011/0108378 A1 * | 5/2011 | Leone | ................... | F16D 65/128 |
| | | | | 188/218 XL |

(Continued)

FOREIGN PATENT DOCUMENTS

| DE | 93 19 490 U1 | 3/1994 |
|---|---|---|
| EP | 3 051 168 A1 | 8/2016 |

(Continued)

OTHER PUBLICATIONS

Extended European Search Report, Application No. 19214949.0, dated Mar. 9, 2020, 9 pages.

*Primary Examiner* — Christopher P Schwartz

(74) *Attorney, Agent, or Firm* — Foley & Lardner LLP

(57) ABSTRACT

A ventilated type brake disc rotor includes: a pair of sliding plates shaped annular and disposed opposite to each other in an axle direction; and joints formed to connect between the sliding plates and arranged along lines extending in a circumferential direction of the sliding plates. The joints include first joints arranged along a first line and second joints arranged along a second line located in an outer side with respect to the first line in a radial direction of the sliding plates. Each of the second joints includes a first width part and a second width part formed in an inner side with respect to the first width part in the radial direction. The second width part is less in circumferential width than the first width part, and is shaped to decrease in circumferential width as going inwardly in the radial direction.

14 Claims, 13 Drawing Sheets

(56) References Cited

U.S. PATENT DOCUMENTS

2017/0002879 A1* 1/2017 Maronati ............... F16D 65/128
2020/0049207 A1* 2/2020 Tepper .................. F16D 65/128

FOREIGN PATENT DOCUMENTS

| | | |
|---|---|---|
| JP | 5224198 B2 | 7/2013 |
| WO | WO-2004/102028 A1 | 11/2004 |
| WO | WO-2004/102029 A1 | 11/2004 |
| WO | WO-2009/136416 A1 | 11/2009 |
| WO | WO-2011/058594 A1 | 5/2011 |
| WO | WO-2012/164465 A1 | 12/2012 |
| WO | WO-2015/092671 A1 | 6/2015 |
| WO | WO-2018/122668 A1 | 7/2018 |

* cited by examiner

CONVENTIONAL BRAKE DISC ROTOR

VENTILATED TYPE BRAKE DISC ROTOR

BACKGROUND

The present disclosure relates to a ventilated type brake disc rotor that includes a pair of sliding plates opposite to each other and joints connecting between the sliding plates.

Japanese Patent Publication JP 5224198 B2, corresponding to U.S. Pat. No. 9,080,625 B2, discloses a ventilated type brake disc rotor as shown in FIG. 13. The ventilated type brake disc rotor includes: an attachment base 100 for attachment to a vehicle body; an outboard sliding plate 101 and an inboard sliding plate 102 that are a pair of annular sliding plates disposed oppositely to each other and are formed on an outer periphery of the attachment base 100; and first joints 103, second joints 104, and third joints 105 which are formed to connect between the outboard sliding plate 101 and the inboard sliding plate 102. The joints 103 to 105 are disposed radially, and are aligned along three lines in a circumferential direction of the sliding plates 101 and 102, and are arranged in zigzag in a radial direction of the sliding plates 101 and 102. The second joints 104 are aligned along a line outermost in the radial direction. Each of the second joints 104 is formed to have an inverted triangle shape with a circumferential width Wx decreasing gradually as going inwardly in the radial direction.

SUMMARY

The conventional ventilated type brake disc rotor as described above includes the second joints 104 that are formed between the sliding plates 101 and 102, and are aligned along the line outermost in the radial direction, and are formed to have the inverted triangle shape, wherein the second joints 104 are highly influential in rigidity of the brake disc rotor. The forming of the second joints 104 to have the inverted triangle shape may cause the brake disc rotor to decrease in rigidity and undergo a thermal buckling and a judder due to the thermal buckling.

In view of the foregoing, it is favorable to provide a ventilated type brake disc rotor structured to suppress the judder due to the thermal buckling from occurring.

According to one aspect of the present disclosure, a ventilated type brake disc rotor includes: an inboard sliding plate and an outboard sliding plate that are shaped annular and are disposed opposite to each other in an axle direction; and joints that are formed to connect between the inboard sliding plate and the outboard sliding plate, and are arranged along lines extending in a circumferential direction of the inboard sliding plate and the outboard sliding plate, wherein: the joints include first joints arranged along a first line and second joints arranged along a second line located in an outer side with respect to the first line in a radial direction of the inboard sliding plate and the outboard sliding plate; each of the second joints includes a first width part and a second width part formed in an inner side with respect to the first width part in the radial direction; and the second width part is less in circumferential width than the first width part, and decreases in circumferential width as going inwardly in the radial direction.

DETAILED DESCRIPTION

The following describes embodiments of a ventilated type brake disc rotor according to the present disclosure, with reference to the drawings. Each of the embodiments exemplarily shows the ventilated type brake disc rotor configured to be employed in a disc brake for vehicle as per conventional.

Figure 1:
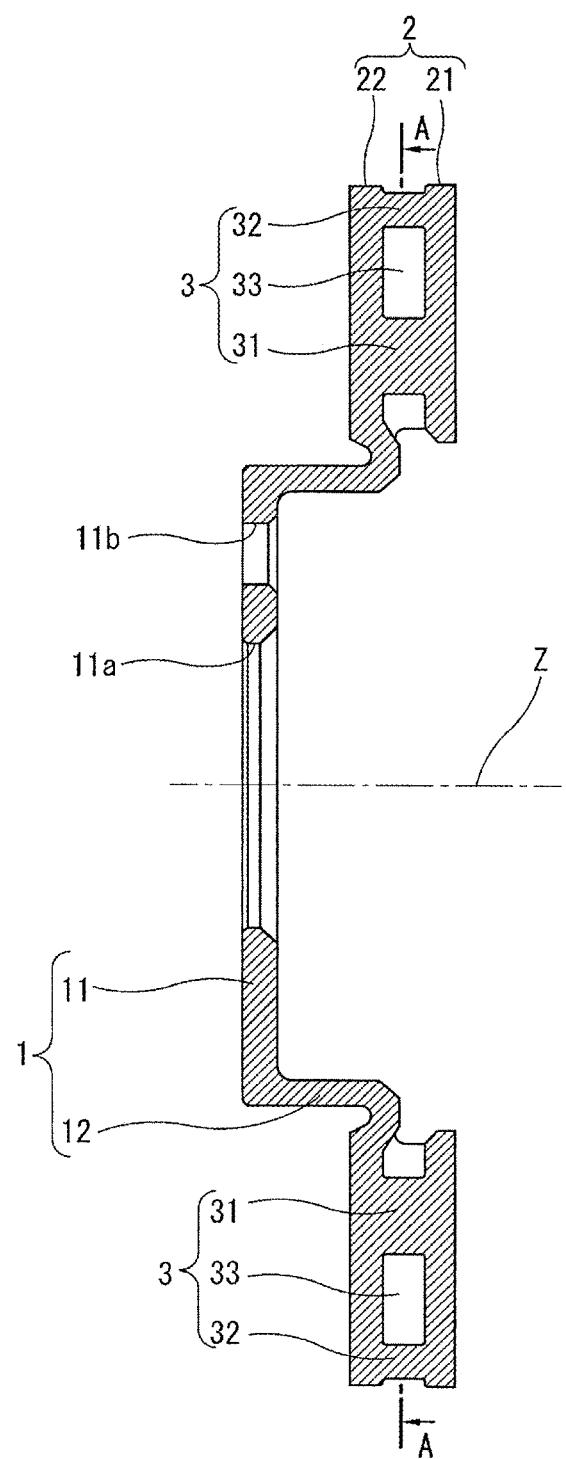
FIG. 1 is a longitudinal sectional view of an exemplary ventilated type brake disc rotor according to the present disclosure, in which an attachment base and an outboard sliding plate of the brake disc rotor are connected to each other.
Figure 2:
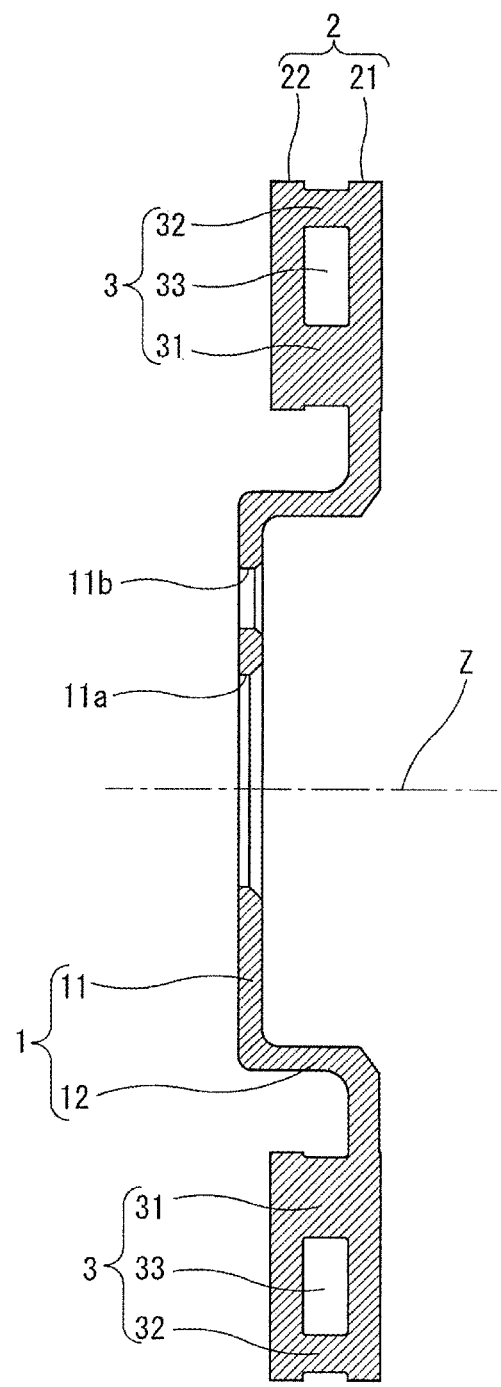
FIG. 2 is a longitudinal sectional view of another exemplary ventilated type brake disc rotor according to the present disclosure, wherein in which an attachment base and an inboard sliding plate of the brake disc rotor are connected to each other.

[First Embodiment] FIGS. 1 to 4 show the ventilated type brake disc rotor according to the first embodiment. FIG. 1 shows a central axis Z of the brake disc rotor. In connection with this, a direction parallel with the central axis Z is referred to as "axial direction", and a direction orthogonal to the central axis Z is referred to as "radial direction", and a direction around the central axis Z is referred to as "circumferential direction". In connection with the axial direction, a right direction (or a right side) in FIG. 1 or 2 is referred to as an inboard direction (or an inboard side) directed toward a vehicle body, and a left direction (or a left side) in FIG. 1 or 2 is referred to as an outboard direction (or an outboard side) directed toward outside of the vehicle body.

Figure 3:
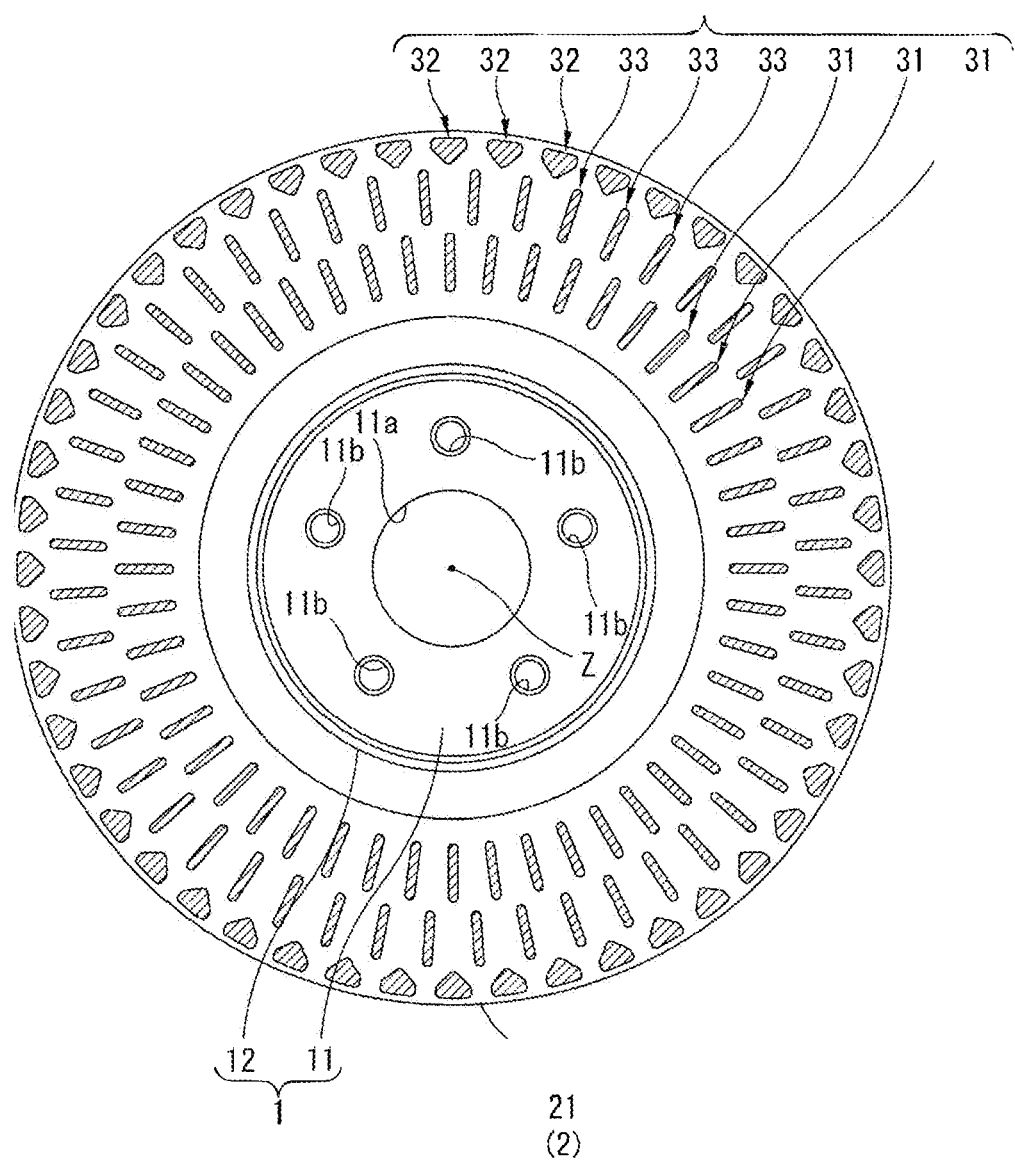
FIG. 3 is a partial sectional view of the brake disc rotor of FIG. 1 along a line A-A shown in FIG. 1, according to a first embodiment of the present disclosure.

FIG. 1 is a longitudinal sectional view of an exemplary ventilated type brake disc rotor according to the present disclosure, wherein the brake disc rotor includes an attachment base 1 and an outboard sliding plate 22 that are connected to each other. FIG. 2 is a longitudinal sectional view of another exemplary ventilated type brake disc rotor according to the present disclosure, wherein the brake disc rotor includes the attachment base 1 and an inboard sliding plate 21 that are connected to each other. FIG. 3 is a partial sectional view of the brake disc rotor of FIG. 1 along a line A-A shown in FIG. 1.

As shown in FIG. 1, the brake disc rotor includes: the attachment base 1 structured to be attached to an axle (not shown) of the vehicle, integrally rotatably with the axle; and a sliding plate member 2 that has a flange-like shape to surround an outer periphery of the attachment base 1 and is structured to be in sliding contact with brake pads (not shown) of the vehicle. The attachment base 1 and the sliding plate member 2 are integrally formed and made of a metallic material such as a gray cast iron. Although the present embodiment is exemplarily configured to integrally make the attachment base 1 and the sliding plate member 2 of a same material, the present disclosure is not limited to that, but may be applied to a brake disc rotor of other configuration. For example, the present disclosure may be applied to a brake disc rotor employing a so-called floating disc in which the attachment base 1 and the sliding plate member 2 may be formed separately and connected to each other via a connecting member such as a pin.

The attachment base 1 has a hat-like shape, and includes an end wall 11 and a peripheral wall 12. The end wall 11 has a disc-like shape, and is structured to be interposed between an axle hub (not shown) formed in the axle of the vehicle and a wheel (not shown) of the vehicle. The peripheral wall 12 has a tubular shape, and extends from an outer rim of the end wall 11 in the axial direction, which is a direction of the axle, in order to make a shift in position of the sliding plate member 2. The sliding plate member 2 is shifted inboard in the axial direction with respect to a position at which the end wall 11 is attached to the axle, due to the peripheral wall 12 extending out with respect to the end wall 11 in the axial direction. Alternatively, the sliding plate member 2 may be positioned without such shift in position with respect to the end wall 11 of the attachment base 1, depending on how the brake disc rotor is configured.

As shown in FIG. 3, the end wall 11 is positioned at a center of the brake disc rotor, and includes a through hole 11*a* and insertion holes 11*b*. The through hole 11*a* is structured such that an outboard end of the axle hub passes through the through hole 11*a*. The insertion holes 11*b* are formed around the through hole 11*a*, and are structured such that each of hub bolts (e.g. four or five hub bolts) of the axle hub passes through a corresponding one of the insertion holes 11*b*. Accordingly, the brake disc rotor is structured to be concentrically attached to the axle such that the through hole 11*a* takes the outboard end of the axle hub in and the insertion holes 11*b* take the hub bolts in.

As shown in FIG. 1, the peripheral wall 12 has an outboard end connected to the outer rim of the end wall 11 and an inboard end connected to an inner rim of the sliding plate member 2, and thereby connects between the end wall 11 and the sliding plate member 2. Although the present embodiment exemplarily show in FIG. 1 the brake disc rotor in which the peripheral wall 12 is connected to the outboard sliding plate 22 of the sliding plate member 2, the present disclosure may be applied to a disc brake rotor of other configuration, such as one shown in FIG. 2 in which the peripheral wall 12 is connected to the inboard sliding plate 21 of the sliding plate member 2.

As shown in FIGS. 1 and 2, the sliding plate member 2 includes the inboard sliding plate 21 and the outboard sliding plate 22 that are a pair of sliding plates disposed oppositely to each other in the axial direction: i.e. in the direction of the axle. As shown in FIGS. 1 and 3, the inboard sliding plate 21 and the outboard sliding plate 22 are joined to each other via joints 3. The joints 3 are interposed between the inboard sliding plate 21 and the outboard sliding plate 22 in the axial direction, and are arranged along lines extending in the circumferential direction, and include first joints 31, second joints 32, and third joints 33. The inboard sliding plate 21 and the outboard sliding plate 22 joined via the joints 3 form ventilation passages 4 therebetween. The ventilation passages 4 are structured to allow air in the sliding plate member 2 to flow out.

The inboard sliding plate 21 is disposed in an inboard side of the sliding plate member 2 in the axial direction so as to face the axle hub, and is structured to be in sliding contact with an inner pad (not shown) that is an inner one of the brake pads. The outboard sliding plate 22 is disposed in the contrary side, which is an outboard side of the sliding plate member 2 in the axial direction, and is structured to be in sliding contact with an outer pad (not shown) that is an outer one of the brake pads.

As shown in FIG. 3, the joints 3 are arranged along three lines extending in the circumferential direction, and are composed of: the first joints 31 arranged along a first line that is an innermost one of the three lines; the second joints 32 arranged along a second line that is an outermost one of the three lines; and the third joints 33 arranged along a third line interposed between the first line and the second line in the radial direction. The first joints 31 are arranged at equal intervals in the circumferential direction, and are formed radially in the radial direction. The second joints 32 and the third joints 33 are respectively similarly arranged and formed. Although the present embodiment exemplarily shows the joints 3 composed of the first, second, and third joints arranged along the three lines, the present disclosure is not limited to that. For example, the joints 3 may be arranged along two lines or four lines.

The ventilation passages 4 include first ventilation passages 41, second ventilation passages 42, and third ventilation passages 43. Each of the first ventilation passages 41 is interposed between adjacent two of the first joints 31 in the circumferential direction. Each of the second ventilation passages 42 is interposed between adjacent two of the second joints 32 in the circumferential direction. Each of the third ventilation passages 43 is interposed between adjacent two of the third joints 33 in the circumferential direction. The ventilation passages 4 allow air to flow out through the first ventilation passages 41, the third ventilation passages 43, and then the second ventilation passages 42, due to rotation of the brake disc rotor.

Figure 4:
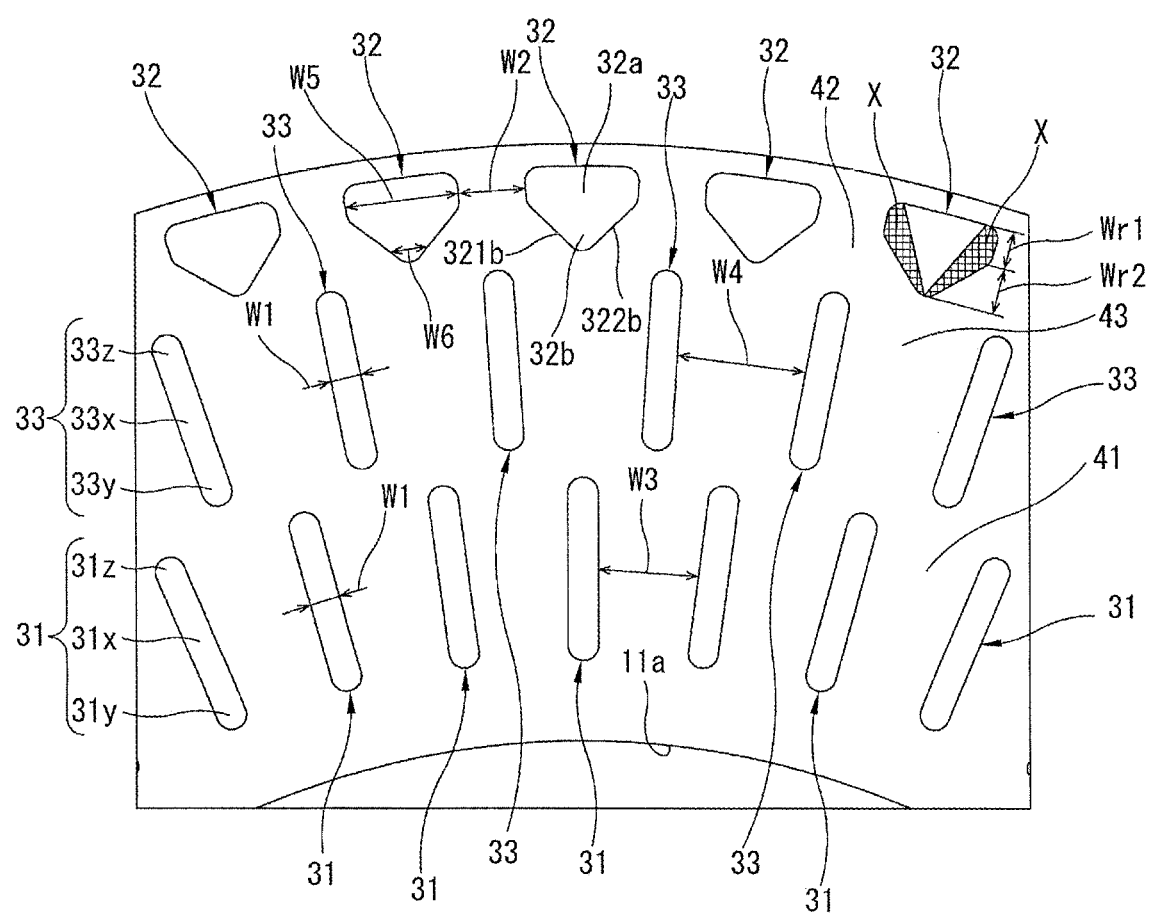
FIG. 4 is a view enlarging a part of FIG. 3.

FIG. 4 is a partial enlarged view enlarging a part of FIG. 3, which shows some of the first joints 31, the second joints 32, and the third joints 33.

As shown in FIGS. 3 and 4, the first joints 31, the second joints 32, and the third joints 33 are formed such that the joints arranged along a same line in the circumferential direction have a same shape. In addition, the first joints 31, the second joints 32, and the third joints 33 are arranged as in zigzag, viewed in the radial direction. In the circumferential direction, the arrangement of the third joints 33 is phase-shifted with respect to the arrangement of the first joints 31 and the arrangement of the second joints 32, although the arrangement of the first joints 31 and the arrangement of the second joints 32 are same in phase in the circumferential direction. The arrangement of the third joints 33 is opposite in phase to the arrangement of the first joints 31 and the arrangement of the second joints 32, in the circumferential direction. In other words, in the circumferential direction, each of the third joints 33 is positioned medially between a pair of the second joints 32 adjacent to the each of the third joints 33.

Each of the first joints 31 has a constant circumferential width W1, and includes a constant width part 31x, a first width-decreasing part 31y, and a second width-decreasing part 31z. Similarly, each of the third joints 33 has the circumferential width W1, and includes a constant width part 33x, a first width-decreasing part 33y, and a second width-decreasing part 33z. Each of the constant width part 31x and the constant width part 33x has a linear shape defined by two sides parallel substantially with each other in the radial direction. The first width-decreasing part 31y is formed in an inner end of each first joint 31 in the radial direction, and has a substantially arc-shaped cross section to gradually decrease in circumferential width as going inwardly in the radial direction. The second width-decreasing part 31z is formed in an outer end of each first joint 31 in the radial direction, and has a substantially arc-shaped cross section to gradually decrease in circumferential width as going outwardly in the radial direction. The first width-decreasing part 33y is formed similarly to the first width-decreasing part 31y, and the second width-decreasing part 33z is formed similarly to the second width-decreasing part 31z. Thus, the first joints 31 and the third joints 33 are configured such that the constant width parts 31x and the constant width parts 33x extend linearly in the radial direction and thereby serve for straightening and smoothing of air flows in the first ventilation passages 41 and the third ventilation passages 43 respectively. Furthermore, the first width-decreasing parts 31y and 33y and the second width-decreasing parts 31z and 33z serve for smoothing of air flows at inlets and outlets of the first ventilation passages 41 and the third ventilation passages 43 respectively, due to the gradual decrease in circumferential width of the width-decreasing parts. The first joints 31 and the third joints 33 are same with each other in circumferential width according to the present embodiment, but may be different from each other in circumferential width depending on how the brake disc rotor is configured.

The circumferential width W1 of the first joints 31 and the third joints 33 is set less than a circumferential interval W2 of the second joints 32. This serves to increase a circumferential width W3 of the first ventilation passages 41 and a circumferential width W4 of the third ventilation passages 43, and reduce the first ventilation passages 41 and the third ventilation passages 43 in ventilation resistance, and improve the sliding plate member 2 (or the brake disc rotor) in efficiency of cooling.

Each of the second joints 32 has a substantially pentagonal cross section, and includes a first width part 32a and a second width part 32b. The first width part 32a is formed in an outer end section of the each of the second joints 32 in the radial direction. The second width part 32b is formed in an inner end section of the each of the second joints 32 in the radial direction, and has a circumferential width that is less than the first width part 32a and decreases as going toward an inner circumferential side of the inboard sliding plate 21 and the outboard sliding plate 22. The first width part 32a and the second width part 32b are integrally formed, and, viewed as a whole, has the substantially pentagonal cross section projecting toward the inner circumferential side.

The first width part 32a has a constant circumferential width W5, and has a substantially rectangular cross section defined by two sides parallel substantially with each other in the radial direction. Although the circumferential width W5 is constant according to the present embodiment, the present disclosure is not limited to such configuration, provided that the circumferential width W5 is set greater than the circumferential width of the second width part 32b. For example, the circumferential width W5 may be set to gradually increase or decrease as going toward the inner circumferential side, depending on how the brake disc rotor is configured.

The second width part 32b has an inverted triangular cross section, and has a circumferential width W6 decreasing gradually as going toward the inner circumferential side of the inboard sliding plate 21 and the outboard sliding plate 22. Although the second width part 32b according to the present embodiment includes two sides 321b and 322b formed linearly in order to allow the circumferential width W6 to gradually decrease, the present disclosure is not limited to such configuration, provided that the second width part 32b is less in circumferential width than the first width part 32a. For example, the second width part 32b may be configured such that the circumferential width W6 decreases step-by-step at different rates. Alternatively, the circumferential width W6 may be set to gradually decrease by forming the two sides 321b and 322b of the second width part 32b to have a nonlinear shape different from the linear shape employed in the present embodiment. For example, each of the two sides 321b and 322b may be formed to have a shape of quadratic curve such as a concave arc shape concaved to be nearer to the first width part 32a (see the seventh embodiment described below) or a convex arc shape projecting to be nearer to the third joint 33, in order for the circumferential width W6 to nonlinearly gradually decrease.

Figure 13:
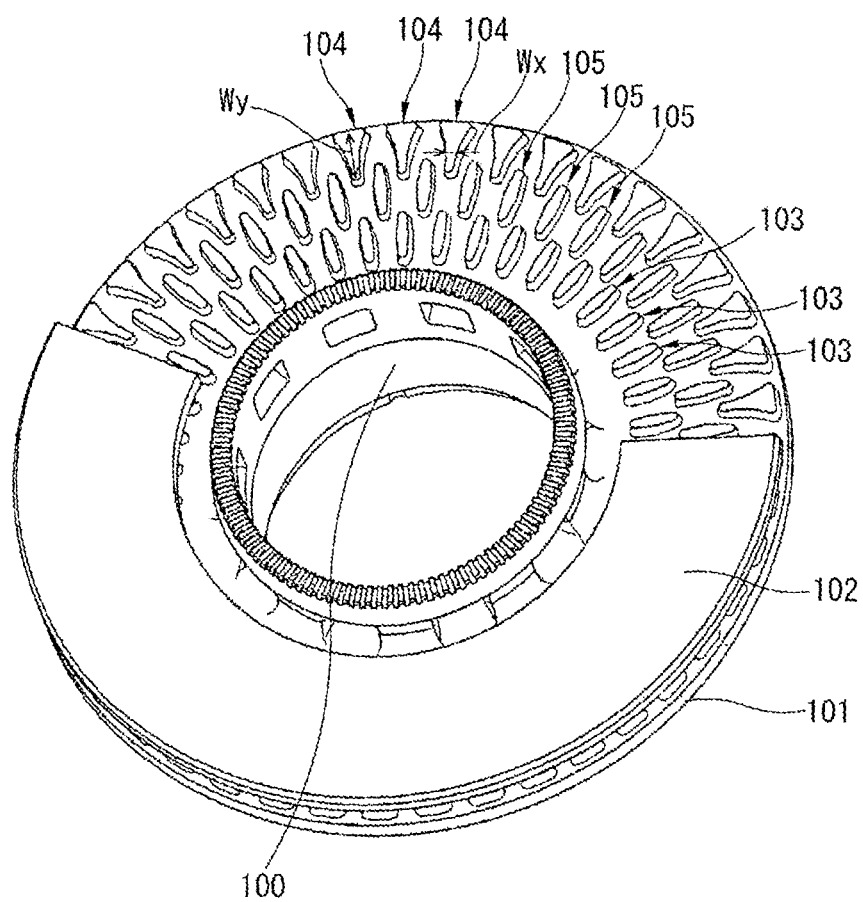
FIG. 13 is a partially sectional perspective view of a conventional ventilated type brake disc rotor.

As shown in FIG. 13, the conventional brake disc rotor is likely to be insufficient in rigidity due to the second joints 104 each of which has the triangular shape projecting inwardly in the radial direction, wherein the second joints 104 are arranged outermost in the radial direction in the outboard sliding plate 101 and the inboard sliding plate 102 and are highly influential in rigidity of the brake disc rotor. This may cause the brake disc rotor to undergo a thermal buckling and a judder due to the thermal buckling.

On the other hand, the ventilated type brake disc rotor according to the present embodiment is configured such that each of the second joints 32 of the joints 3 is composed of the first width part 32a and the second width part 32b and has the pentagonal cross section, wherein the second joints 32 are arranged outermost of the inboard sliding plate 21 and the outboard sliding plate 22 in the radial direction. This serves to increase the second joints 32 in cross-sectional area.

As shown in FIG. 4, the ventilated type brake disc rotor according to the present embodiment may increase in cross-sectional area of the second joints 32, especially the first width part 32a formed in the outer end section of second joint 32 in the radial direction. The pentagonal second joints 32 are greater in cross-sectional area than the triangular second joints 104 of the conventional brake disc rotor by areas of cross-hatched parts X shown in FIG. 4.

Thus, the ventilated type brake disc rotor according to the present embodiment allows the first width part 32a of the second joints 32 to increase in cross-sectional area, wherein the first width part 32a is formed in the outer end section of second joint 32 in the radial direction and is highly influential in rigidity of the brake disc rotor. This serves to effectively improve the brake disc rotor in rigidity, and suppress the brake disc rotor from undergoing the judder due to the thermal buckling.

As described above, each of the second joints 32 has the substantially pentagonal cross section. This increases a degree of freedom in variation in cross-sectional area of the second joints 32 with respect to the second joints 104 of the conventional brake disc rotor each of which has the substantially triangular cross section, by the areas of the cross-hatched parts X shown in FIG. 4, or by area variations of the first width part 32a. Whereas the conventional brake disc rotor has an eigenfrequency variable by adjusting a radial width Wy of each second joint 104 as shown in FIG. 13, the ventilated type brake disc rotor according to the present embodiment has an eigenfrequency variable by adjusting a radial width Wr1 of each first width part 32a and a radial width Wr2 of each second width part 32b as shown in FIG. 4. Thus, the present embodiment configured to form the first width parts 32a and the second width parts 32b serves to increase a degree of freedom in variation in eigenfrequency of the brake disc rotor, and reduce brake noise due to vibration of the brake disc rotor.

Furthermore, according to the present embodiment, the joints 3 are composed of the first joints 31, the second joints 32, and the third joints 33, and are arranged along the three lines extending in the circumferential direction. In detail, the first joints 31 is arranged along the radially innermost one of the three lines, and the second joints 32 is arranged along the radially outermost one of the three lines, and the third joints 33 is arranged along a radially median one of the three lines. Such provision of the third joints 33 in addition to the first joints 31 and the second joints 32 serves to increase a degree of freedom in layout of the ventilation passages 4 formed among the joints 3, in comparison with a case that the joints 3 are arranged in two lines of the first joints 31 and the second joints 32 and does not include the third joints 33. This allows the ventilation passages 4 to perform efficient ventilation, and improves the brake disc rotor in efficiency of cooling.

Figure 5:
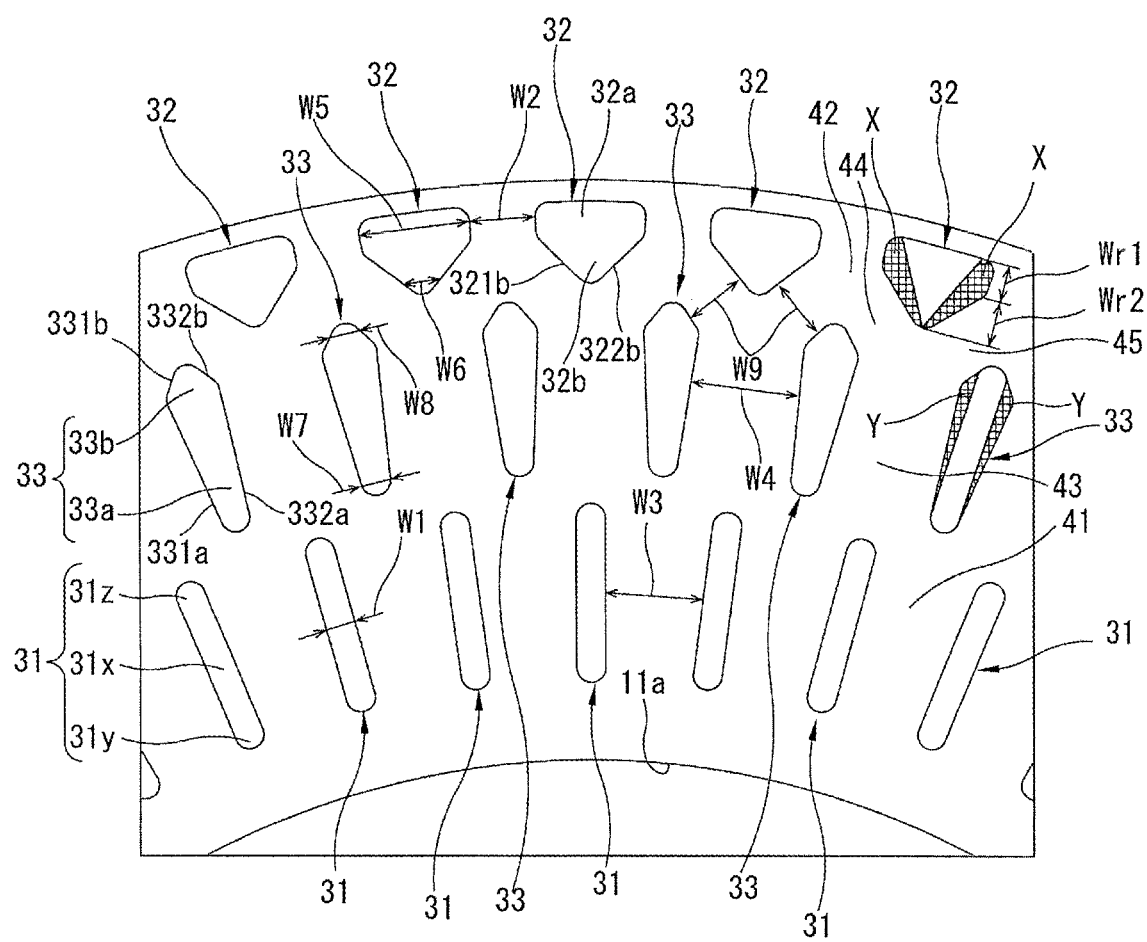
FIG. 5 is a partial enlarged view similar to FIG. 4, which shows the brake disc rotor according to a second embodiment of the present disclosure.

[Second Embodiment] FIG. 5 shows the ventilated type brake disc rotor according to the second embodiment of the present disclosure. The second embodiment is a variation of the first embodiment, which is configured to modify the third joints 33 with respect to the first embodiment. Except for this modification, the second embodiment is configured similarly to the first embodiment. In the second embodiment, configurations same with the first embodiment are represented by reference numerals same with the first embodiment.

As shown in FIG. 5, the ventilated type brake disc rotor according to the second embodiment includes the third joints 33 each of which has a substantially rhombic cross section and includes a third width part 33a and a fourth width part 33b. Each of the third width part 33a has a circumferential width W7 increasing gradually as going outwardly in the radial direction. Each of the fourth width part 33b is formed integrally with the third width part 33a, and is disposed in an outer side with respect to the third width part 33a in the radial direction, and has a circumferential width W8 decreasing gradually as going toward an outer circumferential side of the sliding plates 21 and 22.

The third width part 33a is defined by two sides 331a and 332a formed as tapered lines, such that the circumferential width W7 increases gradually as going outwardly in the radial direction. This gradual increase of the circumferential width W7 allows a circumferential interval W4 between the third width parts 33a to be constant in the radial direction. In other words, the circumferential width W7 is set to vary at a predetermined rate such that the circumferential interval W4 between the third width parts 33a is constant in the radial direction.

Although the two sides 331a and 332a of the third width part 33a according to the present embodiment are linearly formed for the gradual increase of the circumferential width W7, the present disclosure is not limited to such configuration. For example, the third width part 33a may be configured such that the circumferential width W7 increases step-by-step at different rates. Alternatively, the circumferential width W7 may be set to gradually increase by forming the two sides 331a and 332a of the third width part 33a to have a nonlinear shape different from the linear shape employed in the present embodiment. For example, each of the two sides 331a and 332a may be formed to have a shape of quadratic curve such as an arc shape, in order for the circumferential width W7 to nonlinearly gradually increase.

The fourth width part 33b is defined by two sides 331b and 332b formed as tapered lines, such that the circumferential width W8 decreases gradually as going outwardly in the radial direction. As shown in FIG. 5, the side 331b of the fourth width part 33b is formed parallel with the side 322b of the second width part 32b of the second joint 32 which adjacently faces with the side 331b. Similarly, the side 332b of the fourth width part 33b is formed parallel with the side 321b of the second width part 32b which adjacently faces with the side 332b. This allows a width W9 of first connecting ventilation passages 44 and second connecting ventilation passages 45 to be constant along the first connecting ventilation passage 44 or the second connecting ventilation passage 45, wherein the first connecting ventilation passages 44 and the second connecting ventilation passages 45 are formed between each of adjacently facing pairs of the second joint 32 and the third joint 33, as shown in FIG. 5. In other words, the circumferential width W8 is set to vary at a predetermined rate, in order to set constant an interval between each of the adjacently facing pairs of the second joint 32 and the third joint 33 (i.e. the width W9 of the first connecting ventilation passages 44 and the second connecting ventilation passages 45).

Although the two sides 331b and 332b of the fourth width part 33b according to the present embodiment are linearly formed for the gradual decrease of the circumferential width W8, the present disclosure is not limited to such configuration. For example, the fourth width part 33b may be configured such that the circumferential width W8 decreases step-by-step at different rates. Alternatively, the circumferential width W8 may be set to gradually decrease by forming the two sides 331b and 332b of the fourth width part 33b to have a nonlinear shape different from the linear shape employed in the present embodiment. For example, each of the two sides 331b and 332b may be formed to have a shape of quadratic curve such as an arc shape, in order for the circumferential width W8 to nonlinearly gradually decrease.

Thus, according to the second embodiment, each of the third joints 33 is composed of the third width part 33a and the fourth width part 33b, and has the substantially rhombic cross section. This set the third joints 33 of the second embodiment to be greater in cross-sectional area than the first embodiment by areas of cross-hatched parts Y shown in FIG. 5.

According to the second embodiment, the third width part 33a of each third joint 33 is shaped such that the circumferential width W7 increases as going outwardly in the radial direction, wherein configurations of the sliding plate member 2 in its outer part in the radial direction are relatively highly influential in rigidity of the brake disc rotor. This serves to further effectively improve the brake disc rotor in rigidity.

In case that the third joints 33 are shaped constant in width in the circumferential direction, the third ventilation passages 43, each of which is interposed between adjacent two of the third joints 33 in the circumferential direction, increase in width as going outwardly in the radial direction because each of the third joints 33 is formed to extend in the radial direction. Meanwhile, in this case, an attempt to increase the second joints 32 in cross-sectional area causes the second joints 32 and the third joints 33 to decrease in interval therebetween, and thereby reduces the width W9 of the connecting ventilation passages 44 and 45 formed between the adjacent pairs of the second joint 32 and the third joint 33, and increases the width W9 in variation through the connecting ventilation passages 44 or 45. This results in increase in ventilation resistance against air flowing from the third ventilation passages 43 to the connecting ventilation passages 44 or 45, and may make the brake disc rotor insufficient in coolability.

However, according to the second embodiment, each of the third joints 33 includes the third width part 33a in which the circumferential width W7 increases as going outwardly in the radial direction, and allows the circumferential width W4 of the third ventilation passages 43 to be reduced in variation through the third ventilation passages 43, wherein the circumferential width W4 is constant through the third ventilation passages 43 according to the second embodiment. This serves to reduce gap in passage width between the third ventilation passages 43 and the connecting ventilation passages 44 or 45, and thereby reduce the ventilation resistance against air flowing from the third ventilation passages 43 to the connecting ventilation passages 44 or 45, and improve the brake disc rotor in coolability.

The reduction in ventilation resistance against air flowing from the third ventilation passages 43 to the connecting ventilation passages 44 or 45 serves also to facilitate removal of a casting core (e.g. casting sand core) used for forming the ventilation passages 4 upon casting of the brake disc rotor.

Furthermore, according to the second embodiment, the third joints 33 are shaped to expand in the circumferential direction while the first joints 31 are shaped to have the circumferential width W1 that is constant and less than the circumferential width of the second joints 32 or the third joints 33, in view of conditions that the first joints 31 are arranged in the inner circumferential side of the sliding plates 21 and 22 with respect to the second joints 32 and the third joints 33 and are relatively poorly influential in rigidity of the brake disc rotor. Accordingly, the configuration that the first joints 31 have the smallest circumferential width W1 allows the circumferential width W3 of the first ventilation passages 41 to increase in the inner circumferential side in which the circumferential width is relatively likely to be small. This serves to improve the first ventilation passages 41 in smoothness of ventilation, and thereby improve the brake disc rotor in coolability.

Figure 6:
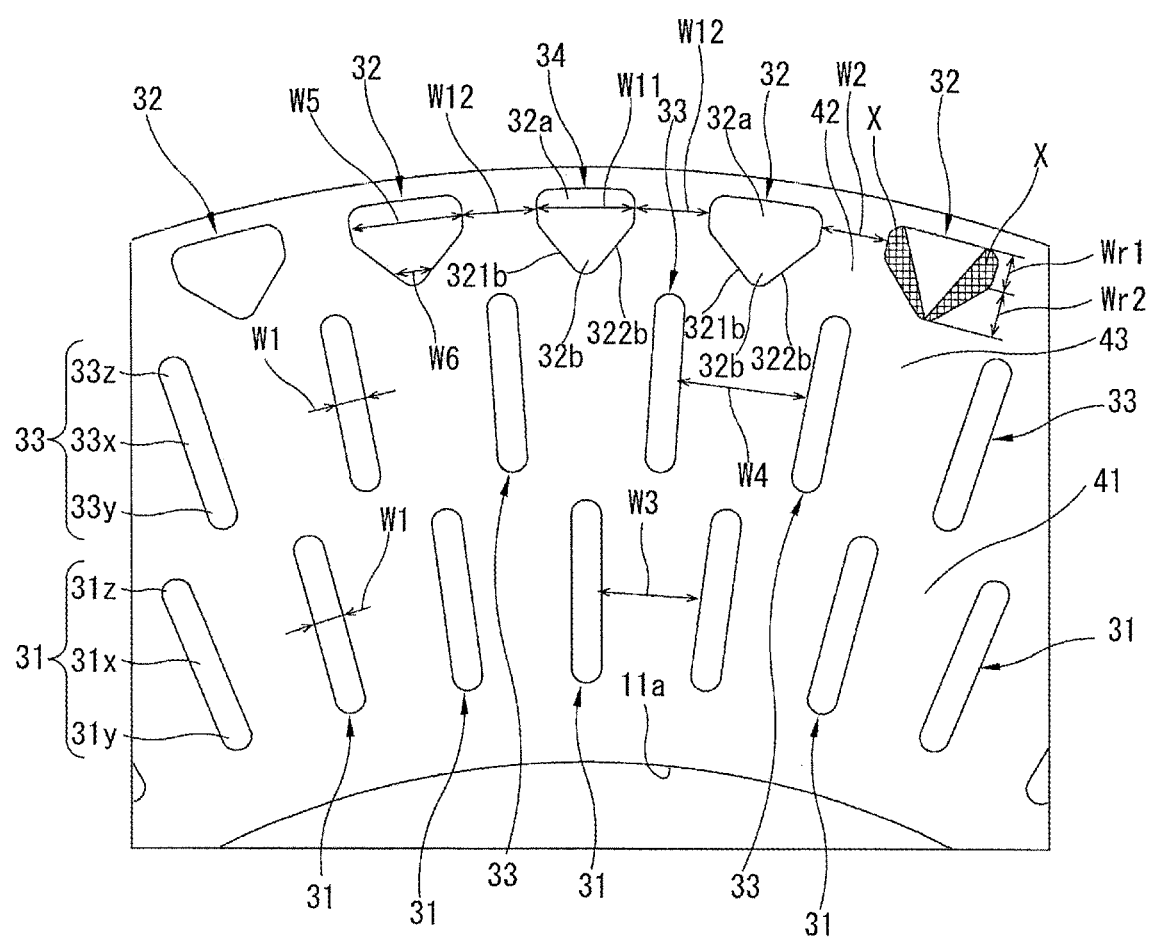
FIG. 6 is a partial enlarged view similar to FIG. 4, which shows the brake disc rotor according to a third embodiment of the present disclosure.

[Third Embodiment] FIG. 6 shows the ventilated type brake disc rotor according to the third embodiment of the present disclosure. The third embodiment is a variation of the first embodiment, which is configured to modify the second joints 32 with respect to the first embodiment. Except for this modification, the third embodiment is configured similarly to the first embodiment. In the third embodiment, configurations same with the first embodiment are represented by reference numerals same with the first embodiment.

As shown in FIG. 6, the ventilated type brake disc rotor according to the third embodiment is configured such that some of the second joints 32 are less in size than the others of the second joints 32. Specifically, a pair/pairs of the second joints 32 disposed symmetrically interposing the central axis Z of the brake disc rotor on a diameter of the sliding plates 21 and 22 is/are formed as a pair/pairs of second narrow joints 34 having a circumferential width W11 less than the circumferential width W5 of the other normal second joints 32. This allows a circumferential interval W12 to be greater than the circumferential interval W2, wherein: the circumferential interval W12 is an interval between each pair of the second joint 32 and the second narrow joint 34 adjacent to each other in the circumferential direction; and the circumferential interval W2 is the interval between each pair of the second joints 32 adjacent to each other in the circumferential direction.

In case that the pairs of the second narrow joints 34 are formed as described above, it is favorable to arrange the pairs of the second narrow joints 34 at predetermine equal intervals in the circumferential direction. This allows the second narrow joints 34 to be appropriately set as nodes or antinodes in a vibrational mode as described below.

Thus, according to the third embodiment, some of the second joints 32 are formed as the second narrow joints 34 having the circumferential width W11 less than the circumferential width of the other second joints 32. This is intended to reduce the brake disc rotor in rigidity of some parts disposed in the circumferential direction. This allows the nodes or the antinodes in the vibration mode to be fixed at the second narrow joints 34, and thereby serves to suppress a stationary vibrational mode from occurring in the brake pads and reduce the brake noise.

The second joints 32 are arranged in an outmost circumferential part of the brake disc rotor and has highly influential in rigidity of the brake disc rotor. Accordingly, the above configurations of the second joints 32 facilitates setting clearly the nodes or the antinodes in the vibration mode. This further serves to suppress the occurrence of stationary vibrational mode and reduce the brake noise.

Figure 7:
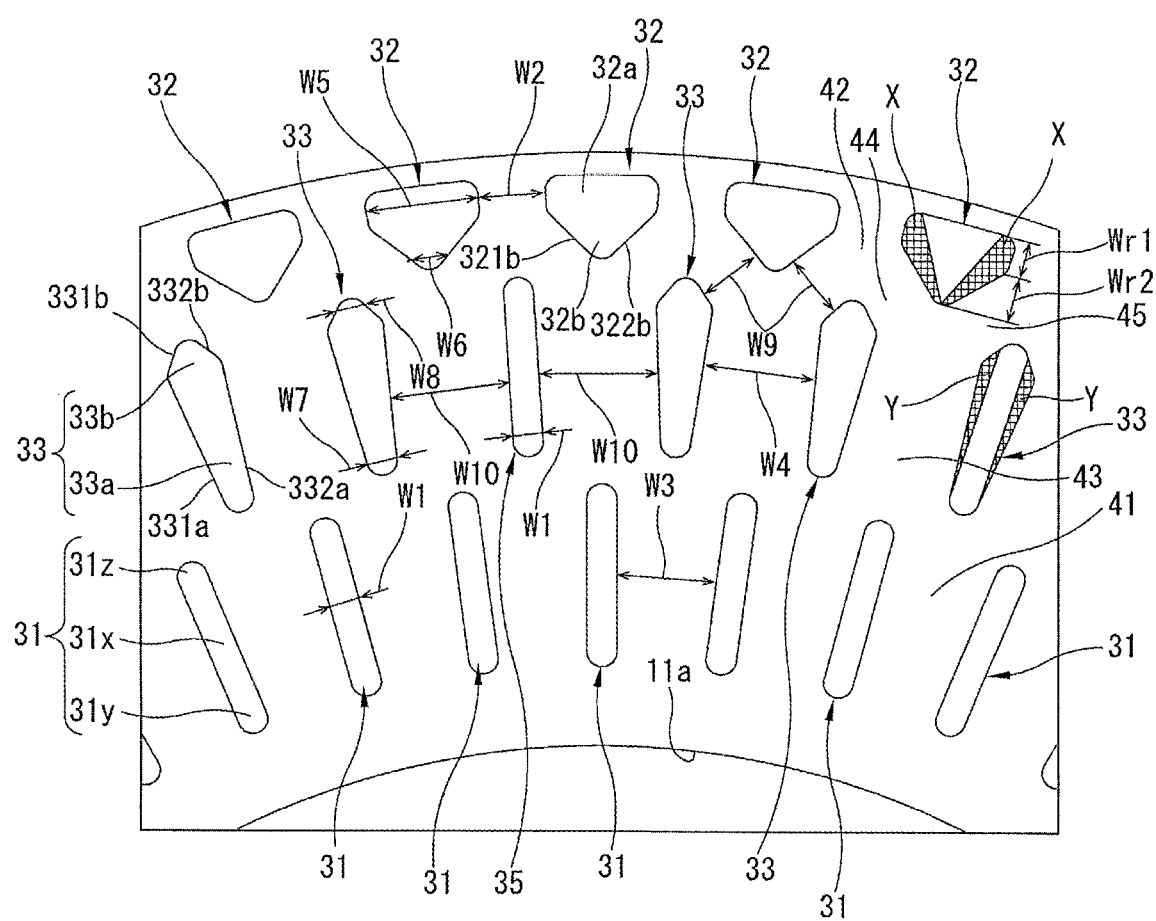
FIG. 7 is a partial enlarged view similar to FIG. 4, which shows the brake disc rotor according to a fourth embodiment of the present disclosure.

[Fourth Embodiment] FIG. 7 shows the ventilated type brake disc rotor according to the fourth embodiment of the present disclosure. The fourth embodiment is a variation based on the second embodiment, which is configured to modify the third joints 33 with respect to the second embodiment. Except for this modification, the fourth embodiment is configured similarly to the second embodiment. In the fourth embodiment, configurations same with the second embodiment are represented by reference numerals same with the second embodiment.

As shown in FIG. 7, the ventilated type brake disc rotor according to the fourth embodiment is configured such that some of the third joints 33 are less in size than the others of the third joints 33. Specifically, a pair/pairs of the third joints 33 disposed symmetrically interposing the central axis Z of the brake disc rotor on a diameter of the sliding plates 21 and 22 is/are formed as a pair/pairs of third narrow joints 35 having the constant circumferential width W1. This allows a circumferential interval W10 to be greater than the circumferential interval W4, wherein: the circumferential interval W10 is an interval between each pair of the third joint 33 and the third narrow joint 35 adjacent to each other in the circumferential direction; and the circumferential interval W4 is the interval between the third joints 33 adjacent to each other in the circumferential direction.

In case that the pairs of the third narrow joints 35 are formed as described above, it is favorable to arrange the pairs of the third narrow joints 35 at predetermine equal intervals in the circumferential direction. This allows the third narrow joints 35 to be appropriately set as nodes or antinodes in a vibrational mode as described below.

Thus, according to the fourth embodiment, some of the third joints 33 are formed as the third narrow joints 35 having the constant circumferential width W1. This is intended to reduce the brake disc rotor in rigidity of some parts disposed in the circumferential direction. This allows the nodes or the antinodes in the vibration mode to be fixed at the third narrow joints 35, and thereby serves to suppress the stationary vibrational mode from occurring in the brake pads and reduce the brake noise.

Figure 8:
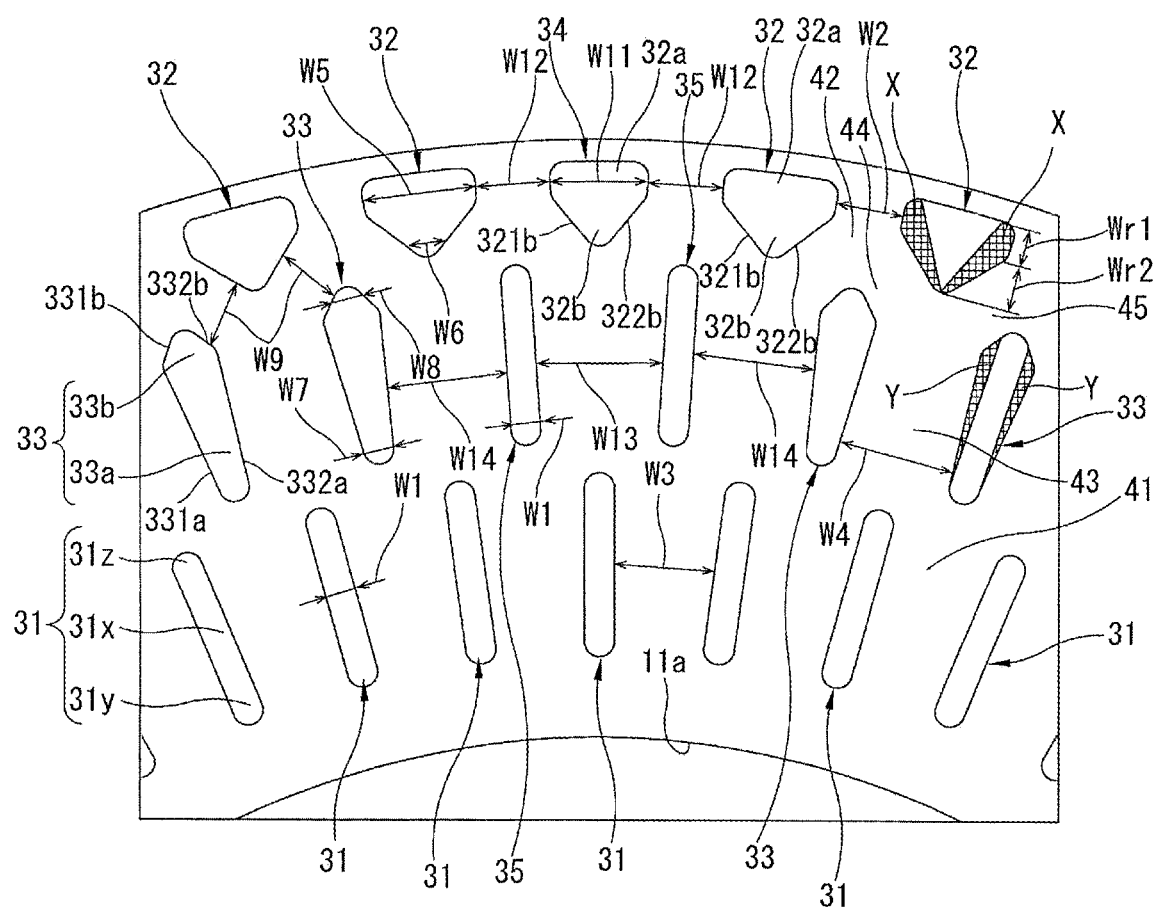
FIG. 8 is a partial enlarged view similar to FIG. 4, which shows the brake disc rotor according to a fifth embodiment of the present disclosure.

[Fifth Embodiment] FIG. 8 shows the ventilated type brake disc rotor according to the fifth embodiment of the present disclosure. The fifth embodiment is a variation based on the second embodiment, which is configured to modify the second joints 32 and the third joints 33 with respect to the second embodiment. Except for these modifications, the fifth embodiment is configured similarly to the second embodiment. In the fifth embodiment, configurations same with the second embodiment are represented by reference numerals same with the second embodiment.

As shown in FIG. 8, the ventilated type brake disc rotor according to the fifth embodiment is configured such that some of the second joints 32 are less in size than the others of the second joints 32. Specifically, a pair/pairs of the second joints 32 disposed symmetrically interposing the central axis Z of the brake disc rotor on a diameter of the sliding plates 21 and 22 is/are formed as the pair/pairs of the second narrow joints 34 having the circumferential width W11 less than the circumferential width W5 of the other normal second joints 32. This allows the circumferential interval W12 to be greater than the circumferential interval W2, wherein: the circumferential interval W12 is the interval between each pair of the second joint 32 and the second narrow joint 34 adjacent to each other in the circumferential direction; and the circumferential interval W2 is the interval between each pair of the second joints 32 adjacent to each other in the circumferential direction.

Furthermore, some of the third joints 33 are less in size than the others of the third joints 33. Specifically, a pair of the third joints 33 adjacent to one of the second narrow joints 34 are formed as a pair of the third narrow joints 35 having the constant circumferential width W1 less than the width of the other normal third joints 33. In other words, one second narrow joint 34 is accompanied by one pair of the third joints 33 formed as one pair of third narrow joints 35. This allows a circumferential interval W13 and a circumferential interval W14 to be greater than the circumferential width W4, wherein: the circumferential interval W13 is an interval between the third narrow joints 35 of the pair; and the circumferential interval W14 is an interval between the pair of the third narrow joint 35 and the third joint 33 adjacent to the pair of the third narrow joint 35 in the circumferential direction.

In case that a plurality of the second narrow joints 34 are provided, a plurality of the pairs of the third narrow joint 35 may be disposed such that each of the second narrow joints 34 is adjacent to the pair of the third narrow joint 35.

Although the fifth embodiment exemplarily shows that one second narrow joint 34 is accompanied by one pair of the third narrow joints 35, a plurality of the second joint 32 adjacent in the circumferential direction may be formed as the second narrow joints 34. In this case, the third narrow joints 35 accompanying the second narrow joints 34 adjacent in the circumferential direction are disposed one more in number than those second narrow joints 34. Thus, the ventilated type brake disc rotor may be configured such that: n second joints 32 adjacent in the circumferential direction are replaced with the second narrow joints 34; and n+1 third joints 33 adjacent to these second narrow joints 34 are replaced with the third narrow joints 35.

According to the fifth embodiment, some of the second joints 32 are replaced with the second narrow joints 34, and the pair of third joints 33 adjacent to one of the second narrow joints 34 is replaced with the pair of third narrow joints 35. This facilitates setting clearly the nodes or the antinodes in the vibration mode. This further serves to suppress the occurrence of stationary vibrational mode in the brake pads and reduce the brake noise.

Furthermore, according to the fifth embodiment, one pair of third joints 33 are replaced with the third narrow joints 35 and are lowered in rigidity with respect to one second joints 32, wherein the third joints 33 are arranged along the radially median line, and wherein the second joints 32 are arranged along the radially outmost line. This configuration has merits in reducing the brake noise and simultaneously securing relatively high rigidity in comparison with the sixth embodiment described below in which a pair of the second joints 32 are replaced with the second narrow joints 34 and are lowered in rigidity.

Figure 9:
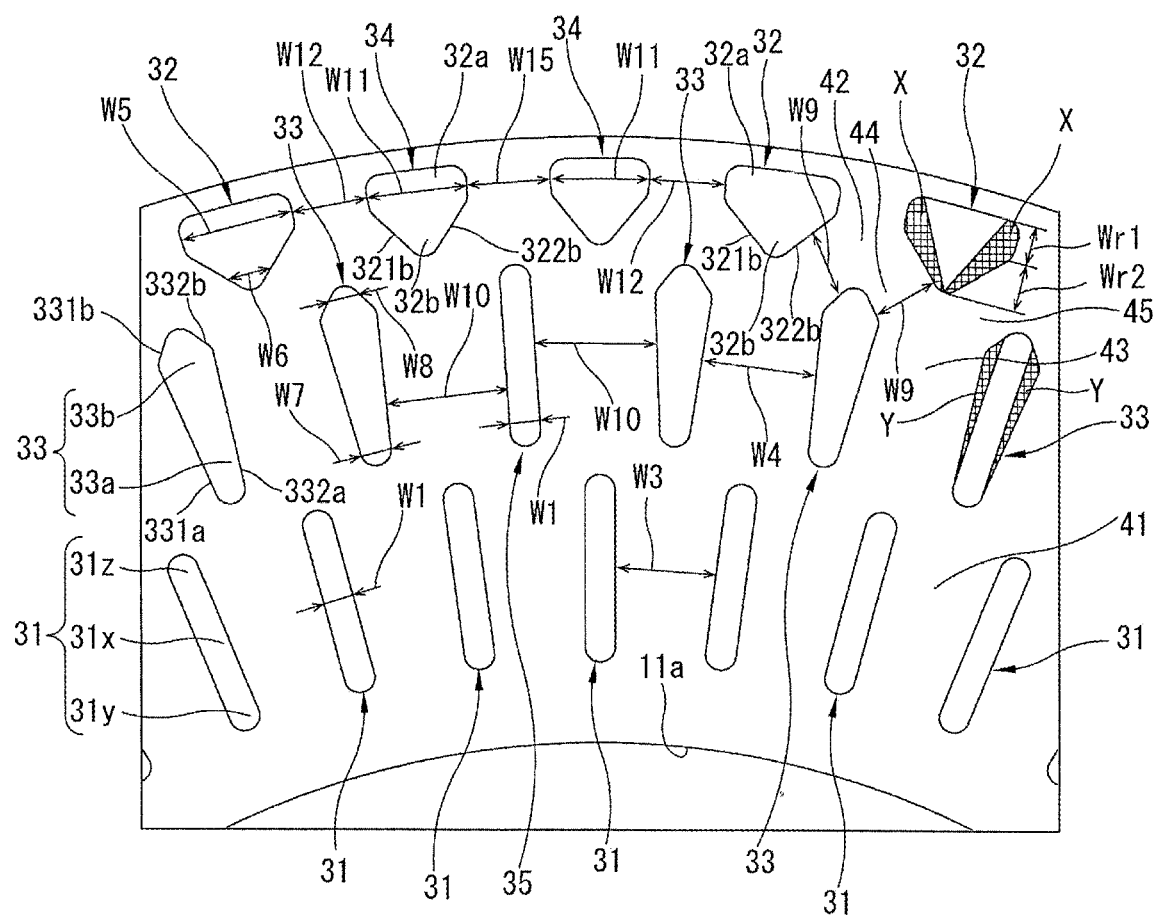
FIG. 9 is a partial enlarged view similar to FIG. 4, which shows the brake disc rotor according to a sixth embodiment of the present disclosure.

[Sixth Embodiment] FIG. 9 shows the ventilated type brake disc rotor according to the sixth embodiment of the present disclosure. The sixth embodiment is a variation based on the second embodiment, which is configured to modify the second joints 32 and the third joints 33 with respect to the second embodiment. Except for these modifications, the sixth embodiment is configured similarly to the second embodiment. In the sixth embodiment, configurations same with the second embodiment are represented by reference numerals same with the second embodiment.

As shown in FIG. 9, the ventilated type brake disc rotor according to the sixth embodiment is configured such that a pair of adjacent second joints 32 is replaced with a pair of the second narrow joints 34 having the circumferential width W11 less than the circumferential width W5 of the other second joints 32, wherein the pair of adjacent second joints 32 is disposed symmetrically with another pair of adjacent second joints 32, interposing the central axis Z therebetween on a diameter of the sliding plates 21 and 22. This allows the circumferential interval W12 and a circumferential interval W15 to be greater than the circumferential width W2, wherein: the circumferential interval W15 is an interval between the second narrow joints 34 of the pair; the circumferential interval W12 is the interval between the pair of second narrow joints 34 and the second joint 32 adjacent to the pair of second narrow joints 34; and the circumferential interval W2 is the interval between the second joints 32 adjacent to each other.

Although the six embodiment exemplarily shows that the one pair of the second narrow joints 34 is provide on the diameter of the sliding plates 21 and 22, a plurality of pairs of the second narrow joints 34 may be provided and arranged at predetermined intervals in the circumferential direction.

Furthermore, according to the sixth embodiment, the third joint 33 at a circumferentially median position between the pair of the second narrow joints 34 is replaced with the third narrow joint 35 having the constant circumferential width W1 less than the circumferential width of the other third joints 33. In other words, with respect to one pair of second narrow joints 34, one third joint 33 positioned circumferentially medially between the one pair of second narrow joints 34 is replaced with the third narrow joint 35. This makes the circumferential interval W10 greater than the circumferential interval W4, wherein: the circumferential interval W10 is the interval between the pair of third narrow joints 35 and the third joint 33 adjacent to the pair of third narrow joints 35 in the circumferential direction; and the circumferential interval W4 is the interval between the third joints 33 adjacent to each other in the circumferential direction.

In case that a plurality of the pairs of second narrow joints 34 are provided, a plurality of the third narrow joints 35 may be provided and arranged in the circumferential direction, corresponding to the plurality of the pairs of second narrow joints 34.

Although the sixth embodiment exemplarily shows one pair of second narrow joints 34 and one third narrow joint 35 accompanying the one pair of second narrow joints 34, this may be modified such that a group of three or more second joints 32 adjacent in the circumferential direction are replaced with the second narrow joints 34. In such case, the third narrow joints 35 accompanying the group of second narrow joints 34 are disposed one less in number than those second narrow joints 34. Thus, the ventilated type brake disc rotor may be configured such that: n second joints 32 adjacent in the circumferential direction are replaced with the second narrow joints 34; and n−1 third joints 33 adjacent to these second narrow joints 34 are replaced with the third narrow joints 35.

As described above, the sixth embodiment is configured such that: one pair of second joints 32 is replaced with the second narrow joints 34; and one third joints 33 positioned circumferentially medially between the one pair of second narrow joints 34 is replaced with the third narrow joint 35. This facilitates setting clearly the nodes or the antinodes in the vibration mode. This further serves to suppress the occurrence of stationary vibrational mode in the brake pads and reduce the brake noise.

Furthermore, according to the sixth embodiment, one pair of second joints 32 are replaced with the second narrow joints 34 and are lowered in rigidity with respect to one third joint 33, wherein the second joints 32 are arranged along the radially outmost line and wherein the third joints 33 are arranged along the radially median line. This configuration has merits in securing rigidity and simultaneously reducing the brake noise relatively effectively in comparison with the fifth embodiment in which the pair of third joints 33 are replaced with the third narrow joints 35 and are lowered in rigidity.

Figure 10:
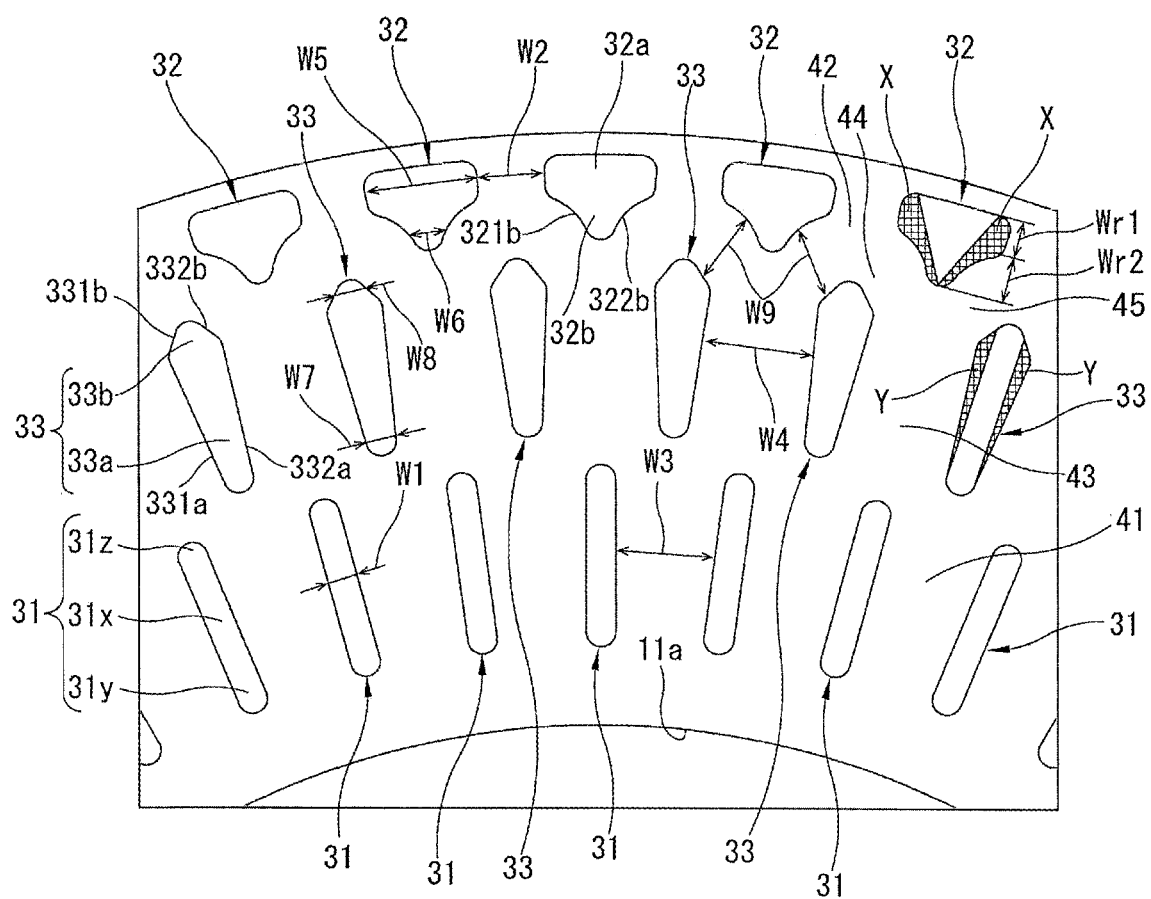
FIG. 10 is a partial enlarged view similar to FIG. 4, which shows the brake disc rotor according to a seventh embodiment of the present disclosure.

[Seventh Embodiment] FIG. 10 shows the ventilated type brake disc rotor according to the seventh embodiment of the present disclosure. The seventh embodiment is a variation based on the second embodiment, which is configured to modify the second joints 32 with respect to the second embodiment. Except for this modification, the seventh embodiment is configured similarly to the second embodiment. In the seventh embodiment, configurations same with the second embodiment are represented by reference numerals same with the second embodiment.

As shown in FIG. 10, the ventilated type brake disc rotor according to the seventh embodiment is configured such that each of the two sides 321b and 322b of the second width part 32b of the second joint 32 has a concave arc shape concaved to be nearer to the first width part 32a: in other words, concaved to be farther from the third joint 33.

Thus, according to the seventh embodiment, each of the two sides 321b and 322b of second width part 32b has the concave arc shape concaved to be nearer to the first width part 32a. This allows the third joints 33 to be shifted in position to approach the second joints 32 in correspondence with shift in shape of the two sides 321b and 322b, while maintaining the width W9 of the first connecting ventilation passages 44 and the second connecting ventilation passages 45 (i.e. the intervals between the pairs of the second joint 32 and the third joint 33 adjacent to each other). In other words, the third joints 33 are allowed to be disposed more outwardly in the radial direction. This serves to further improve the brake disc rotor in rigidity.

Figure 11:
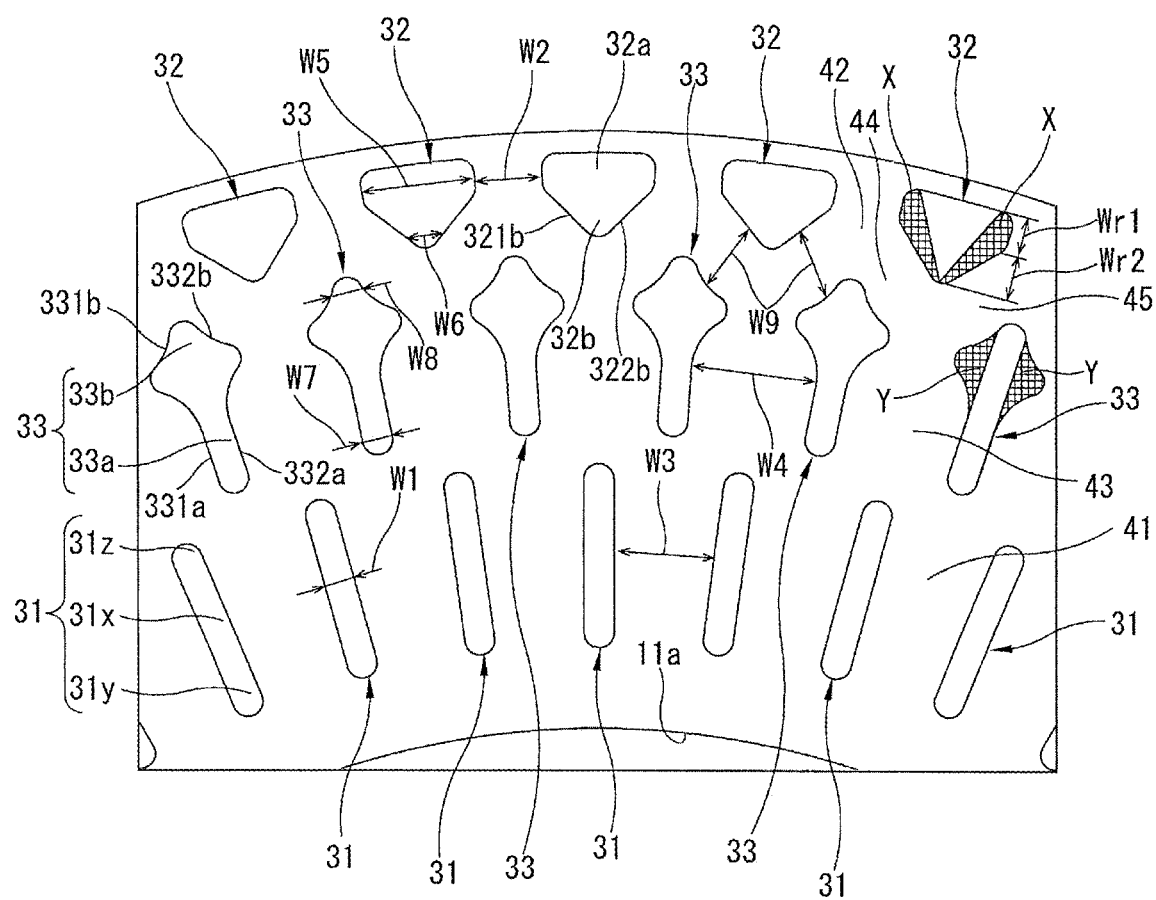
FIG. 11 is a partial enlarged view similar to FIG. 4, which shows the brake disc rotor according to an eighth embodiment of the present disclosure.

[Eighth Embodiment] FIG. 11 shows the ventilated type brake disc rotor according to the eighth embodiment of the present disclosure. The eighth embodiment is a variation based on the second embodiment, which is configured to modify the third joints 33 with respect to the second embodiment. Except for this modification, the eighth embodiment is configured similarly to the second embodiment. In the eighth embodiment, configurations same with the second embodiment are represented by reference numerals same with the second embodiment.

As shown in FIG. 11, the ventilated type brake disc rotor according to the eighth embodiment is configured such that: each of the two sides 331a and 332a defining the third width part 33a of the third joints 33 has a concave arc shape concaved to be nearer to the fourth width part 33b (i.e. to be farther from the first joint 31); and each of the two sides 331b and 332b defining the fourth width part 33b of the third joints 33 has a concave arc shape concaved to be nearer to the third width part 33a (i.e. to be farther from the second joint 32).

Thus, according to the eighth embodiment, each of the two sides 331b and 332b of the fourth width part 33b has the concave arc shape concaved to be nearer to the third width part 33a. This allows the third joint 33 to be shifted in position to approach the second joints 32 in correspondence with shift in shape of the two sides 331b and 332b, while maintaining the width W9 of the first connecting ventilation passages 44 and the second connecting ventilation passages 45 (i.e. the intervals between the pairs of the second joint 32 and the third joint 33 adjacent to each other). In other words, the third joints 33 are allowed to be disposed more outwardly in the radial direction. This serves to further improve the brake disc rotor in rigidity.

Furthermore, according to the eighth embodiment, each of the two sides 331a and 332a of the third width part 33a has the concave arc shape concaved to be nearer to the fourth width part 33b. This allows the first joints 31 to be shifted in position or increased in length to approach the third joints 33 in correspondence with shift in shape of the two sides 331a and 332a, while maintaining intervals between pairs of the first joints 31 and the third joint 33 adjacent to each other. In other words, the first joints 31 are allowed to be disposed more outwardly in the radial direction. This serves to further improve the brake disc rotor in rigidity.

Figure 12:
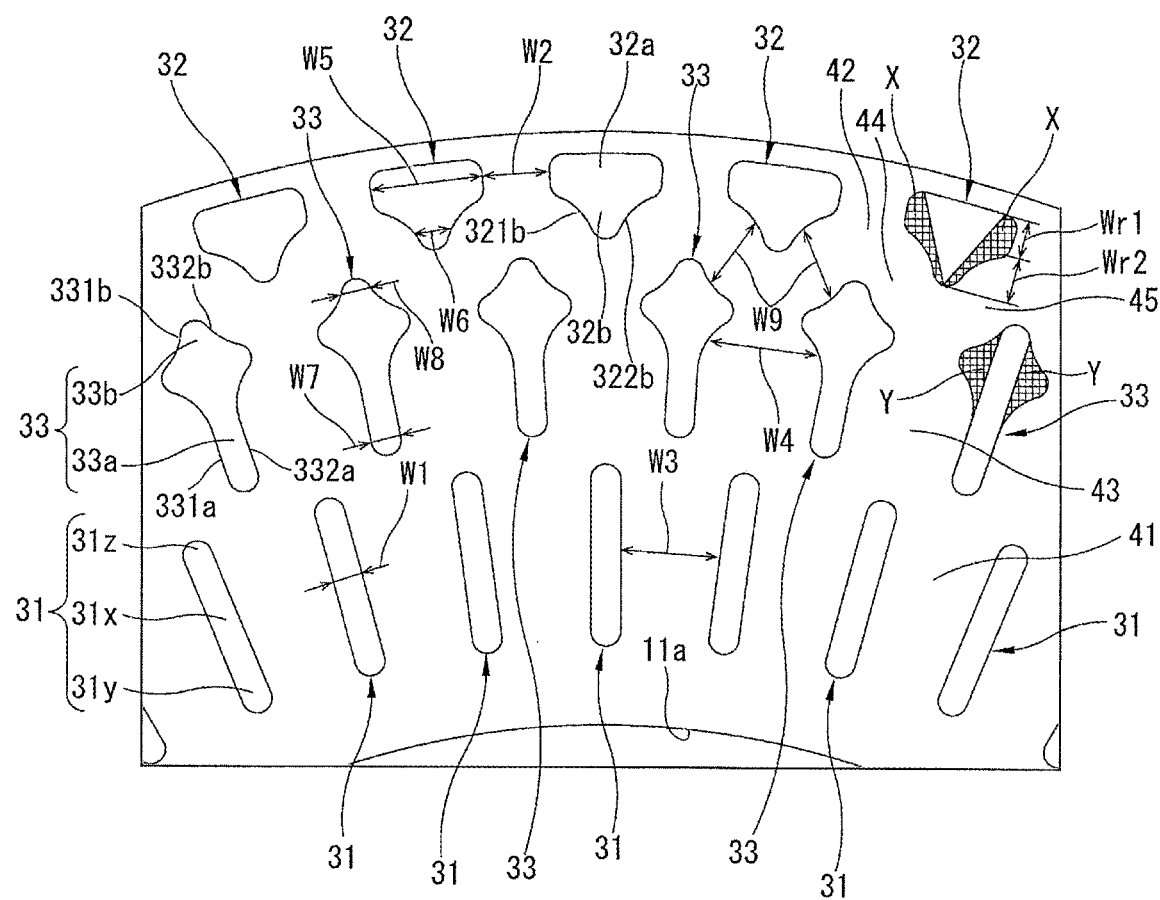
FIG. 12 is a partial enlarged view similar to FIG. 4, which shows the brake disc rotor according to a ninth embodiment of the present disclosure.

[Ninth Embodiment] FIG. 12 shows the ventilated type brake disc rotor according to the ninth embodiment of the present disclosure. The ninth embodiment is a variation based on the seventh embodiment, which is configured to modify the third joints 33 with respect to the seventh embodiment. Except for this modification, the ninth embodiment is configured similarly to the seventh embodiment. In the ninth embodiment, configurations same with the seventh embodiment are represented by reference numerals same with the seventh embodiment.

As shown in FIG. 12, the ventilated type brake disc rotor according to the ninth embodiment is configured such that each of the two sides 321b and 322b defining the second width part 32b of the second joint 32 has the concave arc shape concaved to be nearer to the first width part 32a: in other words, concaved to be farther from the third joint 33.

Furthermore, each of the two sides 331a and 332a defining the third width part 33a of the third joints 33 has the concave arc shape concaved to be nearer to the fourth width part 33b (i.e. to be farther from the first joint 31). Each of the two sides 331b and 332b defining the fourth width part 33b of the third joints 33 has the concave arc shape concaved to be nearer to the third width part 33a (i.e. to be farther from the second joint 32).

Thus, according to the ninth embodiment, each of the two sides 321b and 322b defining the second width part 32b of the second joint 32 has the concave arc shape concaved to be nearer to the first width part 32a, and simultaneously each of the two sides 331b and 332b defining the fourth width part 33b of the third joints 33 has the concave arc shape concaved to be nearer to the third width part 33a. This allows the third joints 33 to be shifted in position to approach the second joints 32 in correspondence with shift in shape of the two sides 321b and 322b and the two sides 331b and 332b, while maintaining the width W9 of the first connecting ventilation passages 44 and the second connecting ventilation passages 45 (i.e. the intervals between the pairs of the second joint 32 and the third joint 33 adjacent to each other). In other words, the third joints 33 are allowed to be disposed more outwardly in the radial direction. This serves to further improve the brake disc rotor in rigidity.

The present disclosure is not limited to the embodiment described above, and may be modified within scope of the present disclosure depending on a target of application of the present disclosure.

For example, according to one of characteristic aspects of the present disclosure, each of the second joints 32 has the substantially pentagonal shape. Provided that each of the second joints 32 has the substantially pentagonal shape, the first joints 31 and the third joints 33 may be formed in any mode depending on configurations of the brake disc rotor.

The following summarizes features of the embodiments of the present disclosure.

According one aspect of the present disclosure, a ventilated type brake disc rotor includes: an inboard sliding plate (21) and an outboard sliding plate (22) that are shaped annular and are disposed opposite to each other in an axle direction; and joints (3) that are formed to connect between the inboard sliding plate (21) and the outboard sliding plate (22), and are arranged along lines extending in a circumferential direction of the inboard sliding plate (21) and the outboard sliding plate (22), wherein: the joints (3) include first joints (31) arranged along a first line and second joints (32) arranged along a second line located in an outer side with respect to the first line in a radial direction of the inboard sliding plate (21) and the outboard sliding plate (22); each of the second joints (32) includes a first width part (32a) and a second width part (32b) formed in an inner side with respect to the first width part (32a) in the radial direction; and the second width part (32b) is less in circumferential width than the first width part (32a), and is shaped to decrease in circumferential width as going inwardly in the radial direction.

Each of the second joints (32) of the joints (3) includes the first width part (32a) and the second width part (32b), and has the pentagonal cross section, wherein the second joints (32) are arranged in an outmost part of the inboard sliding plate (21) and the outboard sliding plate (22) in the radial direction, and are highly influential in rigidity of the brake disc rotor. This allows the first width part (32a) to be increased in cross-sectional area in comparison with the case that each of the second joints (32) has the triangular cross section, and serves to effectively improve the brake disc rotor in rigidity.

The configuration that each of the second joints (32) has the pentagonal cross section also serves to increase the degree of freedom in variation in cross-sectional area of the second joints (32) in comparison with the case that each of the second joints (32) has the triangular cross section, by the area variations of the first width part (32a). This serves to increase the degree of freedom in variation in eigenfrequency of the brake disc rotor, and reduce the brake noise due to vibration of the brake disc rotor.

According to another aspect of the brake disc rotor described above, it is favorable that the joints (3) are arranged along three lines extending in the circumferential direction, and further include third joints (33) arranged along a third line interposed between the first line and the second line in the radial direction.

Such provision of the third joints (33) serves to increase the degree of freedom in layout of the ventilation passages formed among the joints. This allows the ventilation passages to perform efficient ventilation, and improves the brake disc rotor in efficiency of cooling.

According to still another aspect of the brake disc rotor described above, it is favorable that: each of the third joints (33) includes a third width part (33a) and a fourth width part (33b); the third width part (33a) is shaped to increase in circumferential width as going outwardly in the radial direction; and the fourth width part (33b) is formed in the outer side with respect to the third width part (33a) in the radial direction, and is shaped to decrease in circumferential width as going outwardly in the radial direction.

Thus, each of the third joints (33) is formed to increase in circumferential width as going toward the outmost part in the radial direction which is highly influential in rigidity of the brake disc rotor. This serves to further improve the brake disc rotor in rigidity.

In case that the third joints (33) are shaped constant in circumferential width, the ventilation passages formed between the third joints (33) in the circumferential direction increase in width as going outwardly in the radial direction, since each of the third joints (33) is formed to extend in the radial direction. Meanwhile, in such case, the attempt to increase the second joints (32) in cross-sectional area causes the second joints (32) and the third joints (33) to decrease in interval therebetween, and thereby reduces the width of the ventilation passages formed between pairs of the second joint (32) and the third joint (33), and increases the width of those passages in variation with respect to the ventilation passages formed between the third joints (33). This results in increase in ventilation resistance against air flowing from the ventilation passages formed between the third joints (33) to the ventilation passages formed between the pairs of the second joint (32) and the third joint (33), and may make the brake disc rotor insufficient in coolability.

However, according to the aspect described above, each of the third joints (33) includes the third width part (33a) in which the circumferential width increases as going outwardly in the radial direction, and allows the ventilation passages formed between the third joints (33) to be reduced in width variation. This serves to reduce gap in passage width between the ventilation passages formed between the third joints (33) and the ventilation passages formed between the pairs of the second joint (32) and the third joint (33), and thereby reduce the ventilation resistance against air flowing from the ventilation passages formed between the third joints (33) to the ventilation passages formed between the pairs of the second joint (32) and the third joint (33), and improve the brake disc rotor in coolability. Furthermore, this reduction in ventilation resistance serves also to facilitate removal of the casting core (e.g. casting sand core) used for forming the ventilation passages between the joints (3), upon casting of the brake disc rotor.

According to still another aspect of the brake disc rotor described above, it is favorable that some of the second joints (32) are replaced with second narrow joints (34) less in circumferential width than the second joints (32).

The above configuration that some of the second joints (32) are replaced with the second narrow joints (34) less in circumferential width than the second joints (32) is intended to reduce the brake disc rotor in rigidity of some parts disposed in the circumferential direction. This allows the nodes or the antinodes in the vibration mode to be fixed at the second narrow joints (34), and thereby serves to suppress the stationary vibrational mode from occurring in the brake pads and reduce the brake noise. In particular, in the second joints (32) that is arranged in the outmost circumferential part of the brake disk rotor and is highly influential in rigidity of the brake disc rotor, the above configurations facilitate setting clearly the nodes or the antinodes in the vibration mode.

According to still another aspect of the brake disc rotor described above, it is favorable that some of the third joints (33) are replaced with third narrow joints (35) less in circumferential width than the third joints (33).

The above configuration that some of the third joints (33) are replaced with third narrow joints (35) less in circumferential width than the third joints (33) is intended to reduce the brake disc rotor in rigidity of some parts disposed in the circumferential direction. This allows the nodes or the antinodes in the vibration mode to be fixed at the third narrow joints (35), and thereby serves to suppress the stationary vibrational mode from occurring in the brake pads, and reduce the brake noise.

According to still another aspect of the brake disc rotor described above, it is favorable that: some of the second joints (32) are replaced with the second narrow joints (34) less in circumferential width than the second joints (32); and a pair of the third joints (33) adjacent to one of the second narrow joints (34) is replaced with a pair of third narrow joints (35) less in circumferential width than the third joints (33).

Thus, the pair of third narrow joints (35) is provided in addition to providing the second narrow joints (34). This facilitates setting the nodes or the antinodes in the vibration mode further clearly, and further serves to suppress the occurrence of stationary vibrational mode in the brake pads and reduce the brake noise. Furthermore, according to the above aspect, one second joint (32) is lowered in rigidity with respect to one pair of the third joints (33), wherein the second joints (32) are arranged along the radially outmost line and wherein the third joints (33) are arranged along the radially median line. This serves in securing relatively high rigidity in comparison with a case that one pair of second joints (32) are lowered in rigidity with respect to one third joint (33).

According to still another aspect of the brake disc rotor described above, it is favorable that: a pair of the second joints (32) adjacent to each other in the circumferential direction is replaced with a pair of second narrow joints (34) less in circumferential width than the second joints (32); and one of the third joints (33) positioned medially between the pair of the second narrow joints (34) in the circumferential direction is replaced with a third narrow joint (35) less in circumferential width than the third joint (33).

Thus, the third narrow joint (35) is provided in addition to providing the pair of the second narrow joints (34). This facilitates setting the nodes or the antinodes in the vibration mode further clearly, and further serves to suppress the occurrence of stationary vibrational mode in the brake pads and reduce the brake noise. Furthermore, according to the above aspect, one pair of second joints (32) are lowered in rigidity with respect to one third joint (33), wherein the second joints (32) are arranged along the radially outmost line and wherein the third joints (33) are arranged along the radially median line. This causes the brake disc rotor to relatively greatly decrease in rigidity and thereby serves to reduce the brake noise, in comparison with the case that one pair of third joints (33) are lowered in rigidity with respect to one second joint (32).

According to still another aspect of the brake disc rotor described above, it is favorable that: each of the second joints (32) includes two sides (321b, 322b) defining the second width part (32b); and each of the two sides (321b, 322b) of the second width part (32b) has a concave arc shape concaved to be nearer to the first width part (32a).

The above configuration that each of the two sides (321b, 322b) of the second width part (32b) has the concave arc shape concaved to be nearer to the first width part (32a) allows the third joints (33) to be shifted in position or increased in length to approach the second joints (32) in correspondence with shift in shape of the two sides (321b, 322b), while maintaining the intervals between the pairs of the second joint (32) and the third joint (33) adjacent to each other. In other words, the third joints (33) are allowed to be disposed more outwardly in the radial direction. This serves to further improve the brake disc rotor in rigidity.

According to still another aspect of the brake disc rotor described above, it is favorable that: each of the third joints (33) includes two sides (331b, 332b) defining the fourth width part (33b); and each of the two sides (331b, 332b) of the fourth width part (33b) has a concave arc shape concaved to be nearer to the third width part (33a).

The above configuration that each of the two sides (331b, 332b) of the fourth width part (33b) has the concave arc shape concaved to be nearer to the third width part (33a) allows the third joints (33) to be shifted in position or increased in length to approach the second joints (32) in correspondence with shift in shape of the two sides (331b, 332b), while maintaining the intervals between the pairs of the second joint (32) and the third joint (33) adjacent to each other. In other words, the third joints (33) are allowed to be disposed more outwardly in the radial direction. This serves to further improve the brake disc rotor in rigidity.

According to still another aspect of the brake disc rotor described above, it is favorable that: each of the third joints (33) further includes two sides (331a, 332a) defining the third width part (33a); and each of the two sides (331a, 332a) of the third width part (33a) has a concave arc shape concaved to be nearer to the fourth width part (33b).

The above configuration that each of the two sides (331a, 332a) of the third width part (33a) has the concave arc shape concaved to be nearer to the fourth width part (33b) allows the first joints (31) to be shifted in position or increased in length to approach the third joints (33) in correspondence with shift in shape of the two sides (331a, 332a), while maintaining the intervals between the pairs of the first joint (31) and the third joint (33) adjacent to each other. In other words, the first joints (31) are allowed to be disposed more outwardly in the radial direction. This serves to further improve the brake disc rotor in rigidity.

The embodiments of the present disclosure serves to increase in cross-sectional area the first width parts (32a)

disposed in the outmost circumferential part of the brake disc rotor, and suppress the judder due to the thermal buckling from occurring.

The entire contents of Japanese Patent Application 2019-160082 filed on Sep. 3, 2019 are incorporated herein by reference.

The invention claimed is:

1. A ventilated type brake disc rotor comprising:
an inboard sliding plate and an outboard sliding plate that are shaped annular and are disposed opposite to each other in an axle direction; and
joints that are formed to connect between the inboard sliding plate and the outboard sliding plate, and are arranged along lines extending in a circumferential direction of the inboard sliding plate and the outboard sliding plate,
wherein:
the joints include first joints arranged along a first line and second joints arranged along a second line located in an outer side with respect to the first line in a radial direction of the inboard sliding plate and the outboard sliding plate;
each of the second joints includes a first width part and a second width part formed in an inner side with respect to the first width part in the radial direction;
the first width part is constant in circumferential width, and has a substantially rectangular cross section; and
the second width part is less in circumferential width than the first width part, and is shaped to decrease in circumferential width as going inwardly in the radial direction.

2. The brake disc rotor as claimed in claim 1, wherein:
the joints are arranged along three lines extending in the circumferential direction, and further include third joints arranged along a third line interposed between the first line and the second line in the radial direction.

3. The brake disc rotor as claimed in claim 2, wherein:
each of the third joints includes a third width part and a fourth width part;
the third width part is shaped to increase in circumferential width as going outwardly in the radial direction; and
the fourth width part is formed in the outer side with respect to the third width part in the radial direction, and is shaped to decrease in circumferential width as going outwardly in the radial direction.

4. The brake disc rotor as claimed in claim 3, wherein:
each of the second joints includes two sides defining the second width part; and
each of the two sides of the second width part has a concave arc shape concaved to be nearer to the first width part.

5. The brake disc rotor as claimed in claim 4, wherein:
each of the third joints includes two sides defining the fourth width part; and
each of the two sides of the fourth width part has a concave arc shape concaved to be nearer to the third width part.

6. The brake disc rotor as claimed in claim 3, wherein:
each of the third joints includes two sides defining the fourth width part; and
each of the two sides of the fourth width part has a concave arc shape concaved to be nearer to the third width part.

7. The brake disc rotor as claimed in claim 6, wherein:
each of the third joints further includes two sides defining the third width part; and
each of the two sides of the third width part has a concave arc shape concaved to be nearer to the fourth width part.

8. The brake disc rotor as claimed in claim 3, wherein:
some of the second joints are replaced with second narrow joints less in circumferential width than the second joints; and
a pair of the third joints adjacent to one of the second narrow joints is replaced with a pair of third narrow joints less in circumferential width than the third joints.

9. The brake disc rotor as claimed in claim 3, wherein:
a pair of the second joints adjacent to each other in the circumferential direction is replaced with a pair of second narrow joints less in circumferential width than the second joints; and
one of the third joints positioned medially between the pair of the second narrow joints in the circumferential direction is replaced with a third narrow joint less in circumferential width than the third joint.

10. The brake disc rotor as claimed in claim 3, wherein:
some of the second joints are replaced with second narrow joints less in circumferential width than the second joints.

11. The brake disc rotor as claimed in claim 3, wherein:
some of the third joints are replaced with third narrow joints less in circumferential width than the third joints.

12. The brake disc rotor as claimed in claim 2, wherein:
some of the third joints are replaced with third narrow joints less in circumferential width than the third joints.

13. The brake disc rotor as claimed in claim 2, wherein:
some of the second joints are replaced with second narrow joints less in circumferential width than the second joints.

14. The brake disc rotor as claimed in claim 1, wherein:
some of the second joints are replaced with second narrow joints less in circumferential width than the second joints.

* * * * *